(12) United States Patent
Hsieh

(10) Patent No.: US 8,564,677 B2
(45) Date of Patent: Oct. 22, 2013

(54) NETWORK CAMERA AND METHOD FOR CHANGING IMAGE SENSOR OF SAME

(75) Inventor: Ming-Chih Hsieh, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 353 days.

(21) Appl. No.: 13/077,991

(22) Filed: Apr. 1, 2011

(65) Prior Publication Data

US 2012/0162418 A1 Jun. 28, 2012

(30) Foreign Application Priority Data

Dec. 24, 2010 (TW) .............................. 99145944 A

(51) Int. Cl.
*H04N 5/232* (2006.01)
(52) U.S. Cl.
USPC .................................................... 348/211.14
(58) Field of Classification Search
USPC .................................................... 348/211.14
See application file for complete search history.

(56) References Cited

U.S. PATENT DOCUMENTS

| 4,437,111 A * | 3/1984 | Inai et al. ................... 348/222.1 |
| 2006/0050165 A1* | 3/2006 | Amano ......................... 348/320 |
| 2006/0098729 A1* | 5/2006 | Shen ....................... 375/240.01 |

* cited by examiner

*Primary Examiner* — Albert Cutler
(74) *Attorney, Agent, or Firm* — Altis & Wispro Law Group, Inc.

(57) ABSTRACT

A network camera includes a mainboard system and an audio/video capture system. The mainboard system includes a system-on-chip. The system-on-chip is configured for encoding video files captured by the network camera. The audio/video capture system includes an image sensor, a bus switch, and a voltage level switch. The bus switch is interconnected between the system-on-chip and the image sensor. The bus switch has an on state where the system-on-chip is electrically connected to the image sensor and an off state where the system-on-chip is not electrically connected to the image sensor. The voltage level switch is electrically connected to the system-on-chip, and has a high voltage level state and a low voltage level state. The system-on-chip is capable of sending instructions to turn the bus switch on or off according to the state of the voltage level switch.

15 Claims, 2 Drawing Sheets

NETWORK CAMERA AND METHOD FOR CHANGING IMAGE SENSOR OF SAME

BACKGROUND

1. Technical Field

The present disclosure relates to a network camera and a method for changing an image sensor of the network camera.

2. Description of Related Art

Network cameras are typically employed for remote monitoring. A commonly used network camera includes a mainboard system and an audio/video capture system. The mainboard system includes a network microchip, a system-on-chip (SOC), and system power microchip. Such chips are expensive and remain unchanged when the network cameras are upgraded. The audio/video capture system includes a lens module and an image sensor. The image sensor may be upgraded regularly for improved performance.

In a commonly used method for changing the image sensor of an audio/video capture system, the network camera is powered off. The existing image sensor is uninstalled from the audio/video capture system and a new image sensor installed. Finally, the network camera is powered on. However, restarting the network camera may take a long time, which limits effective monitoring at that time.

What is needed, therefore, is a network camera and a method for changing the image sensor of the network camera, to overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
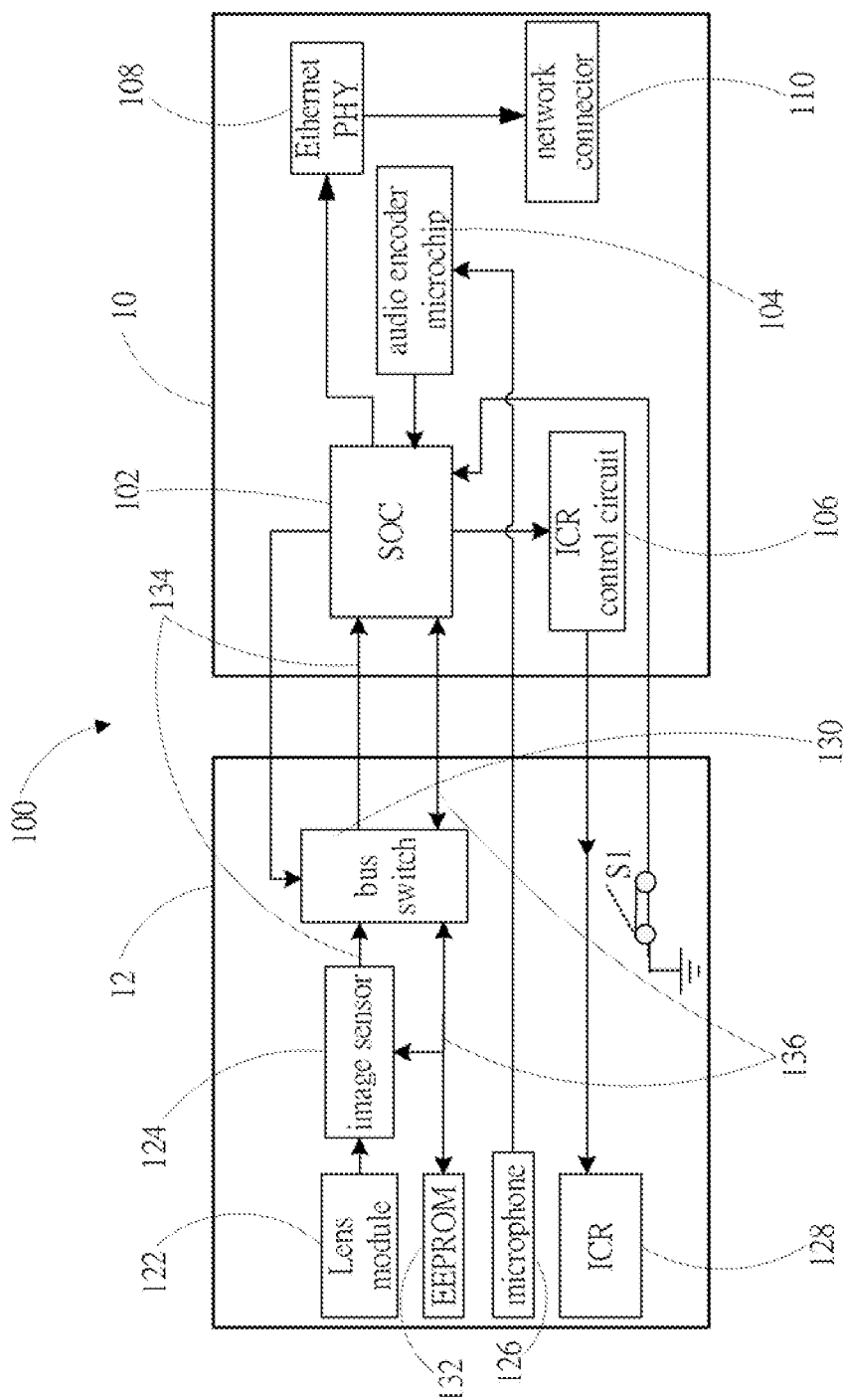
FIG. 1 is a schematic diagram of a network camera in accordance with an exemplary embodiment including a mainboard system and an audio/video capture system.

FIG. 1 is a schematic diagram of a network camera 100 in accordance with an exemplary embodiment includes a mainboard system 10 and an audio/video capture system 12. The network camera 100 can be used for monitoring.

The mainboard system 10 includes an SOC 102, an audio encoder microchip 104, an infrared cut removable (ICR) control circuit 106, an Ethernet PHY 108 and a network connector 110. The SOC 102 decodes and encodes video files received from the audio/video capture system 12, such as H.264 and MPEG-4 files, and controls various circuits in the network camera 100.

The audio encoder microchip 104 is electrically connected to the SOC 102, and is configured for encoding audio signals and sending the encoded audio signals to the SOC.

The ICR control circuit 106 is electrically connected to the SOC 102 and an ICR (for example an ICR 128 in FIG. 1) of the audio/video capture system 12. The ICR control circuit 106 is configured for receiving instructions from the SOC 102 to control the ICR 128.

The Ethernet PHY 108 is electrically connected to the SOC 102 and the network connector 110. The network connector 110 connects the Ethernet PHY 108 to a local area network or a wide area network, and connects the network camera 100. In this embodiment, the network connector 110 can be a RJ-45 connector.

The audio/video capture system 12 includes a lens module 122, an image sensor 124, a microphone 126 and an ICR 128. The lens module 122 is optically aligned with the image sensor 124, and configured for focusing light on the image sensor 124. The image sensor 124 is configured for detecting light passing through the lens module 122, thus generating image/video signals.

The microphone 126 is configured for collecting audio information in the monitoring location. The audio information is converted into electrical signals and transmitted to the audio encoder microchip 104 which encodes the electrical signals into audio signals. The audio signals are then transmitted to the SOC 102.

The ICR 128 can switch to an infrared-cut filter during the day, whereby all infrared light is filtered to obtain undistorted color images and switch to a visible light interference filter at night, with the infrared light source eliminating other stray light interference, such that images/video captured by the image sensor 124 are clearer. The ICR 128 is connected to the ICR control microchip 108. The ICR 128 can switch between the infrared-cut filter and the visible light interference filter under control of the ICR control microchip 108.

The audio/video capture system 12 further includes a voltage level switch S1, a bus switch 130 and an electrically erasable programmable read-only memory (EEPROM) 132.

The voltage level switch S1 is electrically connected to the SOC 102 and switchable between on and off states. A voltage level of the voltage level switch S1 detected by the SOC 102 is defined as Detect_IO. When the voltage level switch S1 is turned on, the voltage level switch S1 is grounded. That is, Detect_IO=low. Conversely, when the voltage level switch S1 is turned off, Detect_IO=high. When Detect_IO=low, the image sensor 124 is working normally. The voltage level switch S1 can be a push-button type.

The SOC 102 is connected to the image sensor 124 and the EEPROM 132 through the bus switch 130. When the bus switch 130 is turned on, connections between the SOC 102 and the image sensor 124 and between the SOC 102 and the EEPROM 132 are created. When the bus switch 130 is turned off, the connections between the SOC 102 and the image sensor 124 and between the SOC 102 and the EEPROM 132 are cut off. On and off states are controlled by the SOC 102. In this embodiment, when Detect_IO=Low, the SOC 102 sends an instruction to turn on the bus switch 130 through an I2C bus 136. The image/video signals are transmitted to the SOC 102 by YUV (a color space in terms of one luma (Y') and two chrominance (UV) components) buses 134 between the image sensor 124 and the bus switch 130 and between the bus switch 130 and the SOC 102. The EEPROM 132 is connected to the SOC 102 by the I2C buses 136 between the EEPROM 132 and the bus switch 130 and between the bus switch 130 and the SOC 102.

The EEPROM 132 is electrically connected to the image sensor 124 by the I2C bus 136, and is configured for storing setting parameters of the image sensor.

When the voltage level switch S1 is turned on, the Detect_IO becomes low and the SOC 102 generates and sends an instruction to turn on the bus switch 130. Setting parameters in the EEPROM 132 are sent to the SOC 102. The SOC 102 generates an initial setting instruction corresponding to the setting parameters to the image sensor 124 for initially setting the image sensor 124. The image sensor detects image/video information in the monitoring location and generates image/ video information signals, which are transmitted to the SOC 102. The SOC 102 codes the image/video signals and generates coding image/video signals. The coding image/video signals are finally transmitted to the control center through the Ethernet PHY 108 and the network connector 110.

When the voltage level switch S1 is turned off, the Detect_IO becomes high and the SOC 102 generates and sends an instruction to turn off the bus switch 130, thus the connections between the SOC 102 and the image sensor 124 and between the SOC 102 and the EEPROM 132 are cut off. That is, the image/video capturing of the image sensor 124 is paused. The image sensor 124 is replaced. The voltage level switch S1 is turned on, and the upgraded network camera 100 resumes function.

In this embodiment, only the voltage level switch S1 is turned off to power down the audio/video capture system 12 when changing the image sensor 124, and the mainboard system 10 continues to function. After replacement of the image sensor 124, monitoring is resumed by the voltage level switch S1 being turned on.

It is understood that the audio/video capture system 12 can function normally when the voltage level switch S1 is turned off, and power down when the voltage level switch S1 is turned on.

Figure 2:
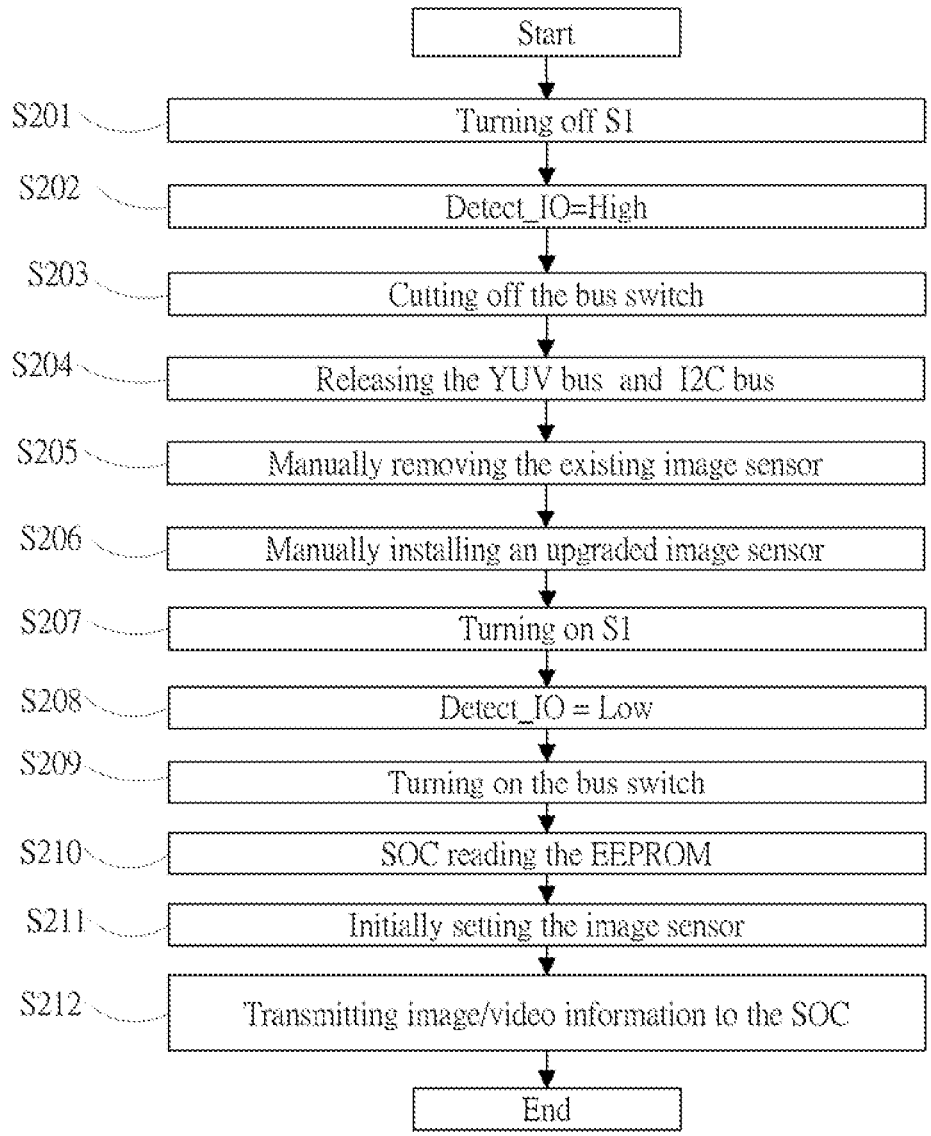
FIG. 2 is a flowchart illustrating one embodiment of a method for changing an image sensor of the network camera.

Referring also to FIG. 2, a method for changing an image sensor of a network camera 100 in accordance with another exemplary embodiment is provided, in which image sensor 124 is replaced by an upgraded sensor, as follows.

Voltage level switch S1 is turned off (S201), whereby Detect_IO varies from low to high (S202), interrupting connection between the SOC 102 and the image sensor 124. Thus, the bus switch 130 is cut off (S203), and the YUV bus 134 and I2C bus 136 released (S204), and the audio/video capture system 10 powered down.

Image sensor 124 is manually removed from the audio/video capture system 12 (S205), and an upgraded image sensor is installed (S206). In this method, the image sensor may be manually installed.

Voltage level switch S1 is turned on, (S207), and Detect_IO varies from high to low (S208) accordingly and SOC 102 sends an instruction to turn on the bus switch 130 (S209). The setting parameters of the image sensor stored in the EEPROM 132 are transmitted to the SOC 102 (S210). The SOC 102 sends an instruction according to the setting parameters to initially set the image sensor 124 (S211). Finally, the audio/video capture system 12 picks up image/video information transmitted to the SOC 102 of the mainboard system 10 (S212). Image sensor replacement is complete.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described in the present disclosure.

What is claimed is:

1. A network camera, comprising:
   a mainboard system comprising a system-on-chip, the system-on-chip being configured for encoding video files captured by the network camera; and
   an audio/video capture system comprising:
      an image sensor for detecting image and video information of a monitoring location;
      a bus switch interconnected between the system-on-chip and the image sensor, the bus switch having an on state wherein the system-on-chip is electrically connected to the image sensor, and an off state wherein the system-on-chip is not electrically connected to the image sensor;
      a voltage level switch electrically connected to the system-on-chip, the voltage level switch having a high voltage level state and a low voltage level state, the system-on-chip capable of sending instructions to turn on and turn off the bus switch according to the voltage level state of the voltage level switch; and
      an EEPROM configured for storing setting parameters of the image sensor, the EEPROM being selectively electrically connected to the system-on-chip through the bus switch, the on state of the bus switch corresponding to connection between the system-on-chip and the EEPROM and the off state of the bus switch corresponding to disconnection between the system-on-chip and the EEPROM.

2. The network camera of claim 1, further comprising I2C buses interconnecting between the system-on-chip and the bus switch, between the bus switch and the EEPROM, and between the bus switch and the image sensor, the I2C buses being configured for transmitting the setting parameters of the image sensor from the EEPROM to the system-on-chip and from the system-on-chip to the image sensor.

3. The network camera of claim 2, further comprising YUV buses interconnecting between the image sensor and the bus switch and between the bus switch and the system-on-chip, the YUV buses being configured for transmitting image and video signals from the image sensor to the system-on-chip.

4. The network camera of claim 1, wherein the audio/video capture system further comprises an ICR used for switching between an infrared-cut filter and a visible light interference filter, and the mainboard system further comprises an ICR control circuit connected to the system-on-chip and the ICR for controlling the ICR to switch between the infrared-cut filter and the visible light interference filter according to instructions received from the system-on-chip.

5. The network camera of claim 1, wherein the mainboard system further comprises an Ethernet PHY connected to the system-on-chip and a network connector connected to the Ethernet PHY, the Ethernet PHY and the network connector being configured for connecting the system-on-chip to a local area network or wide area network.

6. The network camera of claim 1, wherein the audio/video capture system further comprises a microphone for collecting audio information, and the mainboard system further comprises an audio encoder microchip connecting to the microphone and the system-on-chip for encoding audio signals received from the microphone and transmitting the encoded audio signals to the system-on-chip.

7. A method for changing the image sensor of the network camera of camera of claim 1, comprising:
   turning the voltage level switch to a first state where the system-on-chip sends an instruction to turn off the bus switch, thereby disconnecting the system-on-chip and the image sensor;

removing the original image sensor;
installing an upgraded image sensor; and
turning the voltage level to a second state where the system-on-chip sends an instruction to turn on the bus switch, thereby connecting the system-on-chip and the image sensor, the image sensor capturing image/video information and sending the image/video information to the system-on-chip.

8. The method of claim 7, wherein the system-on-chip receiving the setting parameters from the EEPROM and sending an instruction according to the setting parameter to initially setting the image sensor when turning on the bus switch.

9. The method of claim 7, wherein the first state of the voltage level switch is the high voltage level state, and the second state of the voltage level switch is the low voltage level state.

10. A network camera, comprising:
a mainboard system comprising a system-on-chip, the system-on-chip being configured for encoding video files captured by the network camera;
an audio encoder microchip connecting to the system-on-chip for encoding audio signals and transmitting the encoded audio signals to the system-on-chip; and
an audio/video capture system comprising:
an image sensor for detecting image and video information of a monitoring location;
a bus switch interconnected between the system-on-chip and the image sensor, the bus switch having an on state wherein the system-on-chip is electrically connected to the image sensor, and an off state wherein the system-on-chip is not electrically connected to the image sensor;
a voltage level switch electrically connected to the system-on-chip, the voltage level switch having a high voltage level state and a low voltage level state, the system-on-chip capable of sending instructions to turn on and turn off the bus switch according to the voltage level state of the voltage level switch; and
a microphone for collecting audio information, the audio encoder microchip being configured for encoding audio signals received from the microphone and transmitting the encoded audio signals to the system-on-chip.

11. The network camera of claim 10, wherein the audio/video capture system further comprises an EEPROM, the EEPROM being configured for storing setting parameters of the image sensor, the EEPROM being selectively electrically connected to the system-on-chip through the bus switch, the on state of the bus switch corresponding to connection between the system-on-chip and the EEPROM and the off state of the bus switch corresponding to disconnection between the system-on-chip and the EEPROM.

12. The network camera of claim 11, further comprising I2C buses interconnecting between the system-on-chip and the bus switch, between the bus switch and the EEPROM, and between the bus switch and the image sensor, the I2C buses being configured for transmitting the setting parameters of the image sensor from the EEPROM to the system-on-chip and from the system-on-chip to the image sensor.

13. The network camera of claim 12, further comprising YUV buses interconnecting between the image sensor and the bus switch and between the bus switch and the system-on-chip, the YUV buses being configured for transmitting image and video signals from the image sensor to the system-on-chip.

14. The network camera of claim 10, wherein the audio/video capture system further comprises an ICR used for switching between an infrared-cut filter and a visible light interference filter, and the mainboard system further comprises an ICR control circuit connected to the system-on-chip and the ICR for controlling the ICR to switch between the infrared-cut filter and the visible light interference filter according to instructions received from the system-on-chip.

15. The network camera of claim 10, wherein the mainboard system further comprises an Ethernet PHY connected to the system-on-chip and a network connector connected to the Ethernet PHY, the Ethernet PHY and the network connector being configured for connecting the system-on-chip to a local area network or wide area network.

* * * * *